(12) United States Patent
Mizuta et al.

(10) Patent No.: US 9,714,062 B2
(45) Date of Patent: Jul. 25, 2017

(54) SADDLE-RIDE-TYPE VEHICLE

(71) Applicant: HONDA MOTOR CO., LTD., Tokyo (JP)

(72) Inventors: Koji Mizuta, Wako (JP); Nobuhiko Nakano, Wako (JP); Mizuki Yamauchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/961,155

(22) Filed: Dec. 7, 2015

(65) Prior Publication Data

US 2016/0214674 A1   Jul. 28, 2016

(30) Foreign Application Priority Data

Jan. 23, 2015  (JP) .................................. 2015-011552

(51) Int. Cl.
*B62J 15/00* (2006.01)
*B62J 99/00* (2009.01)
*B62K 11/04* (2006.01)
*B62J 25/00* (2006.01)

(52) U.S. Cl.
CPC .............. *B62J 15/00* (2013.01); *B62J 99/00* (2013.01); *B62K 11/04* (2013.01); *B62J 25/00* (2013.01)

(58) Field of Classification Search
CPC ............. B62J 15/00; B62J 23/00; B62J 27/00
See application file for complete search history.

(56) References Cited

U.S. PATENT DOCUMENTS

| 8,499,878 B2* | 8/2013 | Yamakura | B62J 6/005 180/219 |
| 8,864,002 B2* | 10/2014 | Iida | B62J 7/04 224/413 |
| 9,365,253 B2* | 6/2016 | Kishi | B62J 1/28 |
| 9,434,243 B2* | 9/2016 | Nakao | B60K 1/04 |

FOREIGN PATENT DOCUMENTS

| JP | 2008213534 A | * | 9/2008 |
| JP | 2013-023121 A | | 2/2013 |

* cited by examiner

*Primary Examiner* — Kevin Hurley
(74) *Attorney, Agent, or Firm* — Birch, Stewart, Kolasch & Birch, LLP

(57) ABSTRACT

A saddle-ride-type vehicle for allowing a passenger's hand holding a grip to minimally slip. The saddle-ride-type vehicle is provided with grips mounted on a seat frame and formed for a passenger who rides behind an operator to grip. The seat frame is covered by a rear cowl. The rear cowl includes front sidewardly projecting portions arranged at positions which overlap with the grips as viewed in a side view of a vehicle and arranged close to the grip as viewed in a plan view.

20 Claims, 6 Drawing Sheets

SADDLE-RIDE-TYPE VEHICLE

CROSS-REFERENCE TO RELATED APPLICATIONS

The present application claims priority under 35 USC 119 to Japanese Patent Application No. 2015-011552 filed Jan. 23, 2015 the entire contents of which are hereby incorporated by reference.

BACKGROUND OF THE INVENTION

1. Field of the Invention

The present invention relates to a saddle-ride-type vehicle.

2. Description of Background Art

Conventionally, a saddle-ride-type vehicle is known wherein a grip is provided for a passenger with a rear cowl being arranged close to an area in the vicinity of a grip end of a grip as viewed from above in a plan view. See, for example, JP-A-2013-23121.

It is desirable for a grip for a passenger that a passenger's hand holding the grip minimally slips relative to the grip. To realize this demand, it may be possible to modify a shape of the grip or a shape of a rear cowl in the vicinity of the grip. However, in the conventional saddle-ride-type vehicle, although the grip and the rear cowl are arranged close to each other as viewed in a plan view, the positional relationship between the grip and the rear cowl in a height direction is indefinite. Thus, it is difficult in a conventional saddle-ride-type vehicle to provide a structure for allowing a passenger's hand to minimally slip.

SUMMARY AND OBJECTS OF THE INVENTION

The invention has been made in view of the above-mentioned circumstances, and it is an object of an embodiment of the present invention to provide a saddle-ride-type vehicle for allowing a passenger's hand holding a grip to minimally slip.

To achieve the above-mentioned object, according to an embodiment of the present invention, a saddle-ride-type vehicle is provided with a grip (43) formed for a passenger who rides behind an operator. The grip (43) is mounted on a vehicle body frame (F), wherein the vehicle body frame (F) is covered by a rear cowl (58). The rear cowl (58) includes a closely arranged portion (171) arranged at a position which overlaps with the grip (43) as viewed in a side view of the vehicle and arranged close to the grip (43) as viewed in a plan view.

According to an embodiment of the present invention, the rear cowl includes the closely arranged portion arranged at the position which overlaps with the grip for a passenger as viewed in a side view of the vehicle and arranged close to the grip as viewed in a plan view. With such a configuration, a distance between the grip and the closely arranged portion of the rear cowl becomes small. Thus, it is difficult for a passenger's hand to pass through between the grip and the closely arranged portion of the rear cowl whereby it is possible to prevent a passenger's hand holding the grip from slipping from the grip.

According to an embodiment of the present invention, the rear cowl (58) is disposed behind a seat (42) of the passenger, and the closely arranged portion (171) is arranged outside a rear edge (42c) of the seat (42) in a vehicle width direction.

According to an embodiment of the present invention, the rear cowl is disposed behind the seat for the passenger, and the closely arranged portion is arranged outside the rear edge of the seat in a vehicle width direction. Accordingly, a distance between the grip and the closely arranged position can be decreased with a simple configuration wherein the closely arranged portion of the rear cowl is arranged outside the rear edge of the seat in a vehicle width direction. Thus, it is possible to prevent a passenger's hand from slipping from the grip.

According to an embodiment of the present invention, a distance between the grip (43) and the closely arranged portion (171) is gradually narrowed as the grip (43) extends rearwardly.

According to an embodiment of the present invention, the distance between the grip and the closely arranged portion is gradually narrowed as the grip extends rearwardly. Thus, the more rearwardly side a passenger's hand positioned between the grip and the closely arranged portion moves, the more strongly the passenger's hand is sandwiched between the grip and the closely arranged portion. Accordingly, it is possible to encourage a passenger to properly hold the grip, and it is also possible to prevent the passenger's hand from slipping from the grip.

Further, according to an embodiment of the present invention, the rear cowl (58) includes a rear center cowl (165) and a pair of left and right rear side cowls (166), end portions (171a) of the rear center cowl (165) and end portions (166c) of the rear side cowls (166) form joint seam portions (177), and the joint seam portion (177) is covered by the grip (43) as viewed in a side view.

According to an embodiment of the present invention, the end portions of the rear center cowl and the end portions of the rear side cowls form joint seam portions with the joint seam portion being covered by the grip as viewed in a side view. Thus, the joint seam portion can be concealed by the grip whereby the external appearance can be enhanced.

Further, according to an embodiment of the present invention, the joint seam portion (177), the end portion (166c) of the rear side cowl (166), is arranged at a position inside the end portion (171a) of the rear center cowl (165) in a vehicle width direction.

According to an embodiment of the present invention, in the joint seam portion, the end portion of the rear side cowl is arranged at a position inside the end portion of the rear center cowl in a vehicle width direction. Thus, it is possible to prevent rainwater or the like from intruding into the joint seam portion from the end portion of the rear side cowl.

According to an embodiment of the present invention, the joint seam portion (177) is arranged at a position inside an extension (184) extending upwardly along a side surface (166a) of the rear side cowl (166) in a vehicle width direction.

According to an embodiment of the present invention, the joint seam portion is arranged at a position inside the extension extending upward along the side surface of the rear side cowl in a vehicle width direction. Thus, it is possible to prevent a passenger's hand holding the grip from coming into contact with the joint seam portion.

According to an embodiment of the present invention, the closely arranged portion (171) is formed on a front end of the rear center cowl (165), and is arranged close to a rear end (163) of the grip (43).

According to an embodiment of the present invention, the closely arranged portion is formed on the front end of the rear center cowl, and is arranged close to the rear end of the grip. Thus, a range within which a passenger can hold the grip can be ensured in a large length and, at the same time, a design having integrity can be acquired where the rear end of the grip and the front end of the rear center cowl are contiguously formed whereby the favorable appearance can be obtained.

According to an embodiment of the present invention, the rear center cowl (165) is formed such that the front end and the rear end of the rear center cowl (165) expand in a vehicle width direction as viewed in a plan view and a longitudinal center portion of the rear center cowl (165) is indented inwardly in the vehicle width direction, and a rear end (172d) of the rear center cowl (165) is positioned behind a rear end (167c) of the rear side cowl (166).

According to an embodiment of the present invention, the rear center cowl is formed such that the front end and the rear end of the rear center cowl expand in the vehicle width direction as viewed in a plan view and the longitudinal center portion of the rear center cowl is indented inwardly in the vehicle width direction with the rear end of the rear center cowl being positioned behind the rear end of the rear side cowl. Accordingly, the rear center cowl is positioned behind the rear side cowl as viewed in a plan view as well as in a side view. Thus, the external appearance is enhanced.

According to an embodiment of the present invention, with the saddle-ride-type vehicle it is possible to prevent a passenger's hand holding the grip from slipping from the grip.

It is possible to prevent a passenger's hand from slipping from the grip with the simple configuration wherein the closely arranged portion of the rear cowl is arranged outside the rear edge of the seat in the vehicle width direction.

By adopting the configuration where the more rearwardly the grip extends, the narrower the distance between the grip and the closely arranged portion becomes, it is possible to encourage a passenger to properly hold the grip.

The external appearance can be enhanced by concealing the joint seam portion by the grip.

It is possible to prevent rainwater or the like from intruding into the joint seam portion from the end portion of the rear side cowl.

It is possible to prevent a passenger's hand holding the grip from coming into contact with the joint seam portion.

A range within which a passenger can hold the grip can be ensured in a large length and, at the same time, a design having integrity can be acquired where the rear end of the grip and the front end of the rear center cowl are continuously formed.

The rear center cowl is positioned behind the rear side cowl as viewed in a plan view as well as in a side view. Thus, the external appearance is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the invention is described with reference to drawings. In the description, directions of "front," "rear," "left," "right," "up" and "down" are equal to the directions of a vehicle body unless otherwise specified. In the respective drawings, symbol FR indicates a front side of the vehicle body, symbol UP indicates an upper side of the vehicle body, and symbol LH indicates a left side of the vehicle body.

Figure 1:
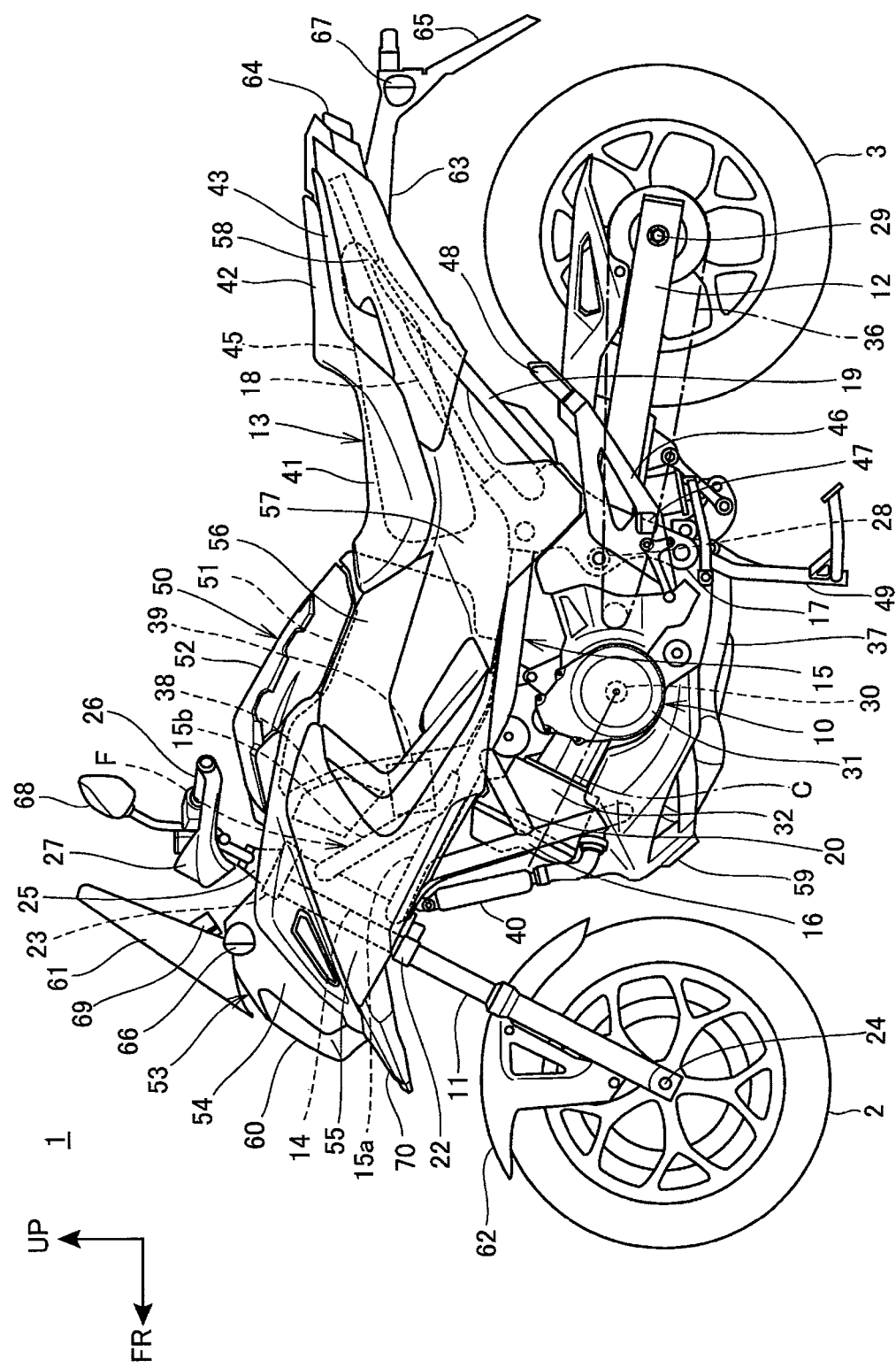
FIG. 1 is a left side view of a motorcycle according to an embodiment of the invention.

FIG. 1 is a left side view of a motorcycle according to an embodiment of the invention. In FIG. 1, with respect to each pair of left and right parts, only a left part is illustrated.

The motorcycle 1 includes an engine 10 which forms a power unit that is supported on a vehicle body frame F. A pair of left and right front forks 11, 11 for supporting a front wheel 2 is supported on a front end of the vehicle body frame F in a steerable manner. A swing arm 12 for supporting a rear wheel 3 is mounted on a rear portion side of the vehicle body frame F. The motorcycle 1 is a saddle-ride-type vehicle where a seat 13, on which an operator sits in a straddling manner, is arranged above a rear portion of the vehicle body frame F.

The vehicle body frame F includes a head pipe 14 mounted on a front end of the vehicle body frame F; a pair of left and right main frames 15, 15 extending rearwardly and downwardly from a lower portion of the head pipe 14; a pair of left and right down frames 16, 16 extending rearwardly and downwardly from front end portions of the main frames 15, 15 with a pair of left and right pivot frames 17, 17 extending downwardly from rear ends of the main frames 15, 15. A pair of left and right seat frames 18, 18 extend rearwardly and upwardly to a rear end portion of the vehicle from upper ends of the pivot frames 17, 17 with a pair of left and right sub frames 19, 19 extending rearwardly and upwardly from upper portions of the pivot frames 17, 17 and connected to rear portions of the seat frames 18, 18.

Each main frame 15 has a main frame body portion 15a extending rearwardly and downwardly from a lower portion of the head pipe 14 with a relatively gentle inclination and a reinforcing frame portion 15b for connecting an upper portion of the head pipe 14 and an intermediate portion of the main frame body portion 15a to each other. The vehicle body frame F also includes a pair of left and right connecting frames 20, 20 which connects the intermediate portions of the main frame body portions 15a, 15a and the down frames 16, 16 to each other.

A steering shaft (not shown in the drawing) is rotatably and pivotally supported on the head pipe 14 with a bottom bridge 22 and a top bridge 23 extending in the vehicle width direction being fixed to a lower end portion and an upper end portion of the steering shaft respectively. The front forks 11, 11 are supported on the bottom bridge 22 and the top bridge 23 with the front wheel 2 is pivotally supported on a front wheel axle 24 which is mounted on lower ends of the front forks 11, 11. The top bridge 23 has a handle holder 25 extending upwardly from an upper surface of the top bridge 23 with a handle bar 26 for steering extending in the vehicle width direction being supported on the handle holder 25. Knuckle guards 27, 27 are mounted on the handle bar 26.

The swing arm 12 has a front end portion thereof pivotally supported on a pivot shaft 28 which connects the left and right pivot frames 17, 17 to each other. Thus, the swing arm 12 is swingable in the vertical direction about the pivot shaft 28. The rear wheel 3 is pivotally supported on a rear wheel axle 29 which penetrates a rear end portion of the swing arm 12.

A rear suspension (not shown in the drawing) is disposed between the swing arm 12 and the vehicle body frame F.

The engine 10 includes a crankcase 31 for supporting a crankshaft 30 extending in the vehicle width direction with a cylinder portion 32 extending to the front and upwardly from a front side of a front portion of the crankcase 31.

The engine 10 is an engine of a type where a cylinder axis C of the cylinder portion 32 is arranged in a frontwardly inclined manner such that the cylinder axis C is closer to the horizontal direction than the vertical direction with a space for arranging parts being secured above the engine 10.

An output of the engine 10 is transmitted to the rear wheel 3 through a chain 36 provided between an output shaft (not shown in the drawing) of the engine 10 and the rear wheel 3.

An exhaust pipe 37 of the engine 10 is pulled out downwardly from a cylinder head of the cylinder portion 32, extends rearwardly after passing through an area below the engine 10, and is connected to a muffler (not shown in the drawing).

An air cleaner box 38, for purifying air supplied to the engine 10, is arranged above front portions of the main frames 15, 15 and behind the head pipe 14. Air which passes through the air cleaner box 38 flows into the cylinder head of the cylinder portion 32 after a flow rate is adjusted by a throttle body (not shown in the drawing). A battery 39 is arranged between the air cleaner box 38 and the main frame body portions 15a, 15a. A radiator 40 of the engine 10 is arranged below the head pipe 14 and in front of the cylinder portion 32.

The seat 13 includes a front seat 41 for an operator with a rear seat 42 for a pillion passenger which is one step higher than the front seat 41. The front seat 41 is arranged above the pivot frames 17, 17 and the front portions of the seat frames 18, 18, and the rear seat 42 is arranged above the seat frames 18, 18. Grips 43, 43, for the pillion passenger (passenger) seated on the rear seat 42 grips, are disposed on left and right sides of the rear seat 42, respectively.

A fuel tank 45 is arranged between the front seat 41, the rear seat 42, and the seat frames 18, 18.

A pair of left and right step holders 46, 46 is arranged on outer sides of the pivot frames 17, 17, respectively, with steps 47, 47 for a rider being fixed to front portions of the respective step holders 46. Tandem steps 48, 48 for a pillion passenger are fixed to rear portions of the respective step holders 46.

A main stand 49 is connected to lower portions of the pivot frames 17, 17.

A storage part 50 is provided above rear portions of the main frames 15, 15 and between the front seat 41 and the head pipe 14. The storage part 50 includes a storage box 51 which has an upper surface thereof opened with a box lid 52 for closing an opening formed on the upper surface of the storage box 51 in an openable and closeable manner.

The storage part 50 has enough capacity to store one full face type helmet. The air cleaner box 38 and the battery 39 are arranged between the storage box 51 and the head pipe 14.

The motorcycle 1 includes a resin-made vehicle body cover 53 for covering the vehicle body. The vehicle body cover 53 includes a front cowl 54, positioned in front of the head pipe 14; a pair of left and right side covers 55, 55, for covering the head pipe 14 and the front portions of the main frames 15, 15 from sides. A pair of left and right box side covers 56, 56 is arranged between the side covers 55, 55 and the front seat 41 for covering an upper portion of the storage box 51 from the sides. A pair of left and right middle covers 57, 57, disposed above the main frames 15, 15, is provided for covering a lower portion of the storage box 51 and a lower portion of the front seat 41. A rear cowl 58 is disposed below the rear seat 42 and covers the seat frames 18, 18 and the sub frames 19, 19 with an undercover 59 for covering the engine 10 from below. A beak-shaped cowl 70 projects to the front and downwardly in a beak shape from a lower side of the front cowl 54. The beak-shaped cowl 70 has a shape tapered toward a distal end side thereof in the vertical direction as well as in the vehicle width direction. The box side covers 56, 56 are also portions that a rider may grip by his/her knees.

The headlight 60 is integrally mounted on a center portion of the front cowl 54 in the vehicle width direction. The beak-shaped cowl 70 projects to the front from the headlight 60.

A wind screen 61 is mounted on an upper portion of the front cowl 54. A front fender 62 is fixed to the front forks 11, 11.

A rear fender 63 is arranged above the rear wheel 3 for covering the fuel tank 45 from below. A tail lamp 64 is mounted on a rear end portion of the rear cowl 58 above a rear end portion of the rear fender 63. A license plate holder 65 is fixed to a rear end of the rear fender 63.

Front blinkers 66, 66 are fixed to the front cowl 54, and rear blinkers 67, 67 are fixed to the rear fender 63. Rear mirrors 68, 68 are fixed to the handle bar 26. Meters 69 for displaying a speed and the like are arranged behind the wind screen 61 and above the front cowl 54.

Figure 2:
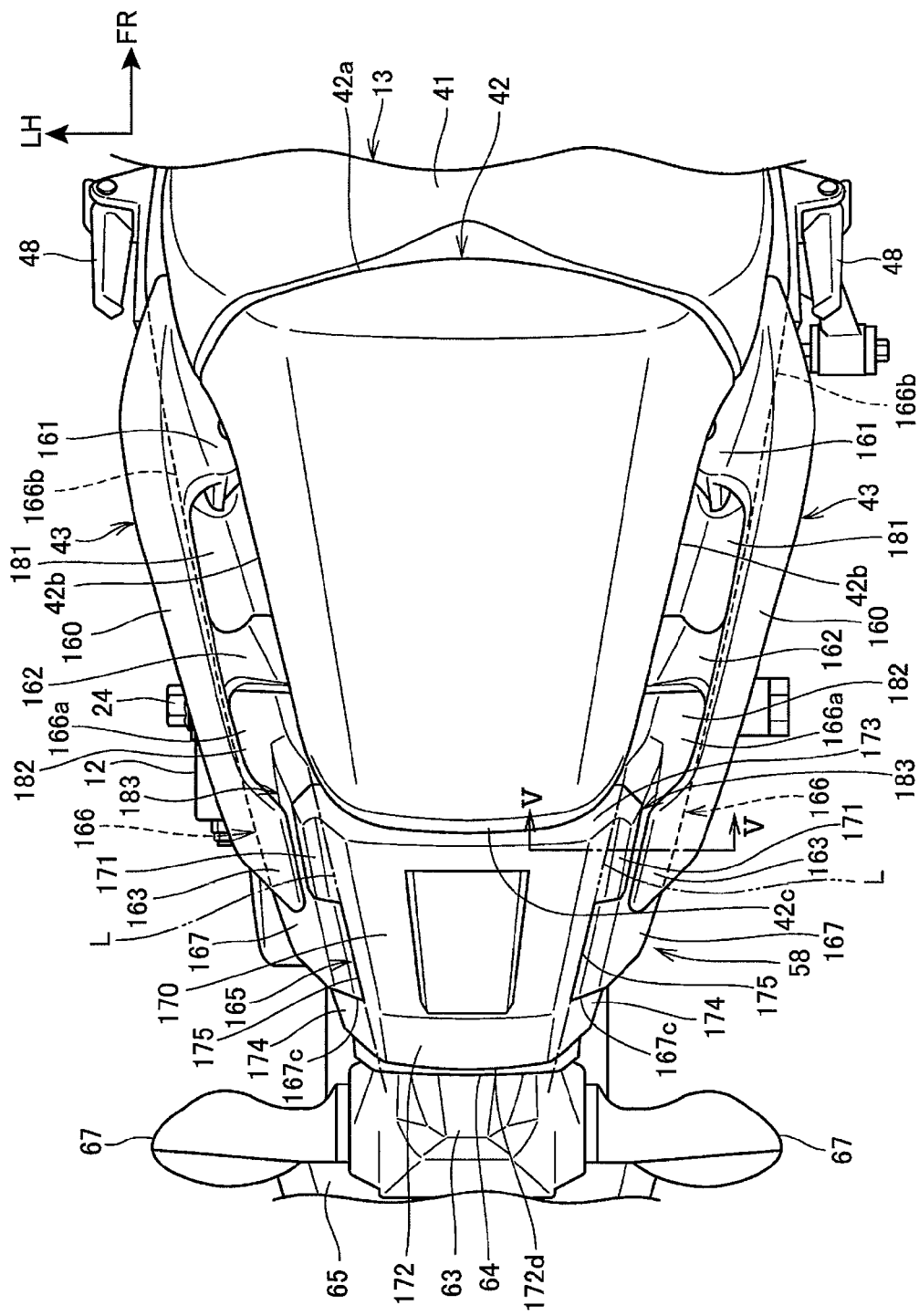
FIG. 2 is a plan view of a rear portion of the motorcycle as viewed from above.
Figure 3:
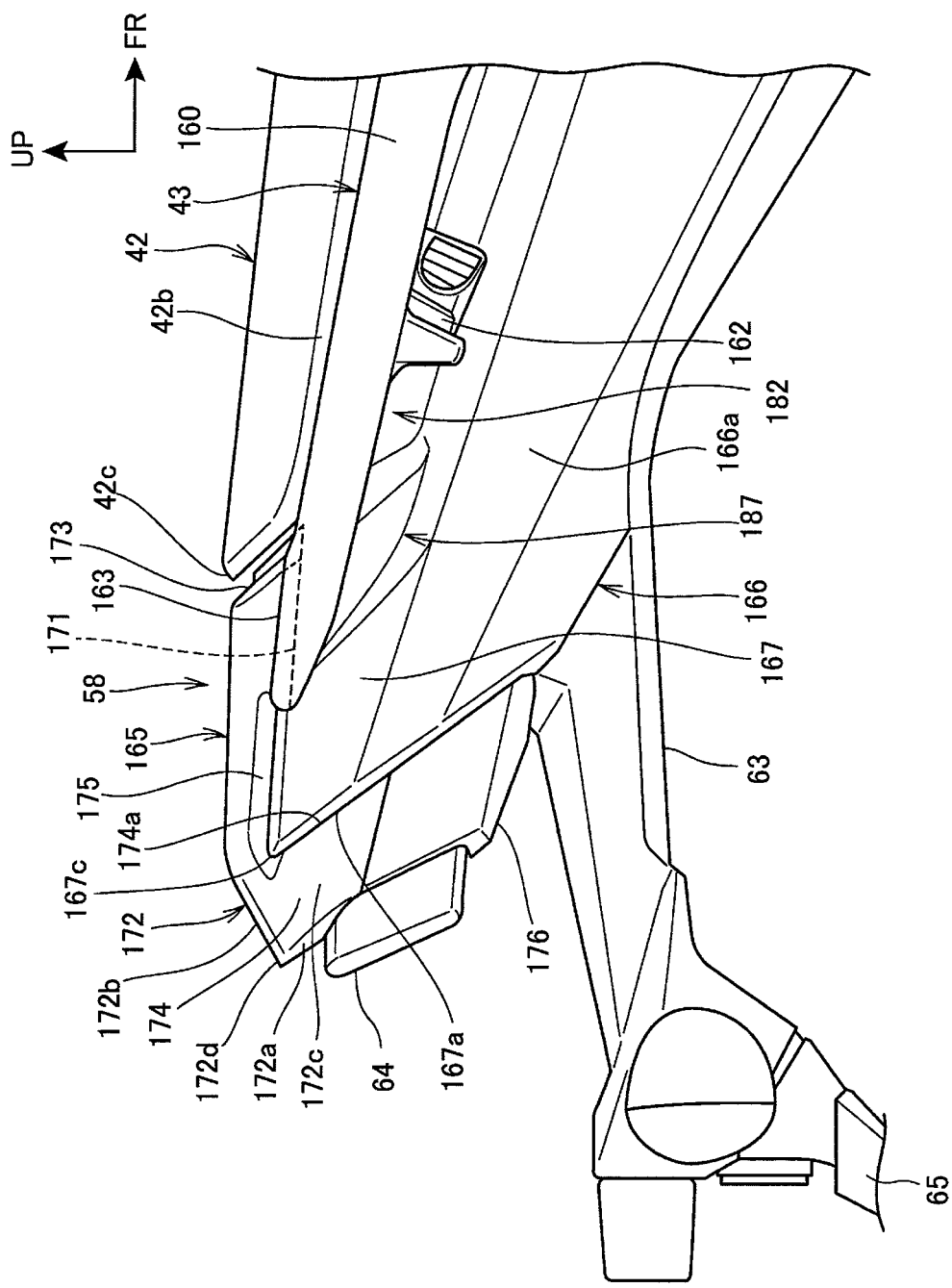
FIG. 3 is a plan view of the rear portion of the motorcycle as viewed from a right side.

FIG. 2 is a plan view of a rear portion of the motorcycle 1 as viewed from above. FIG. 3 is a plan view of the rear portion of the motorcycle 1 as viewed from a right side.

As shown in FIG. 2 and FIG. 3, the rear portion of the motorcycle 1 in the vicinity of the rear seat 42 is formed into a rearwardly and upwardly extending manner, and is also formed into a shape tapered toward a rear portion side as viewed in a plan view and in a side view.

The rear seat 42 is disposed on the center of the motorcycle 1 in the vehicle width direction, and is arranged such that a front edge 42a is contiguously formed with a rear edge of the front seat 41. The rear seat 42 is formed into a tapered shape in the rearward direction, and the left and right side edges 42b, 42b are positioned more inside in the vehicle width direction as the left and right side edges 42b, 42b extend toward a rear portion side with the rear edge 42c (rear edge of the seat) being shorter than the front edge 42a in a vehicle width direction. The rear seat 42 is arranged in a rearwardly and upwardly extending manner as viewed in a side view with a plate thickness of the rear seat 42 being gradually decreased toward a rear side.

The grips 43, 43 (also referred to as grab rails) respectively include a rod-like grip body 160, 160 extending in the longitudinal direction; a front mounting portion 161, 161 extending inwardly in the vehicle width direction from a front end portion of the grip body 160, 160, a rear mounting portion 162, 162 extending inwardly in the vehicle width direction from an intermediate portion of the grip body 160, 160 in the longitudinal direction; and a rear end inwardly projecting portion 163, 163 (a rear end of the grip) formed by bending an rear end of the grip body 160, 160 inwardly and projecting inwardly in the vehicle width direction. The grips 43, 43 are formed in left-and-right symmetry.

Each grip 43 is fastened and fixed to a rear end portion of each seat frame 18 using bolts (not shown in the drawing) which are inserted into the front mounting portion 161 and the rear mounting portion 162, respectively.

The rear cowl 58 includes a rear center cowl 165 arranged at the center in the vehicle width direction behind the rear seat 42 with a pair of left and right rear side cowls 166, 166 arranged on left and right sides of the rear seat 42 and the rear center cowl 165.

The rear side cowls 166, 166 are arranged below the rear seat 42 for covering the rear portions of the seat frames 18, 18 from outside in the sideward direction. The seat frames 18, 18 are formed into a shape tapered toward a rear portion side thereof as viewed in a plan view and a side view.

Outer surfaces 166a, 166a of the rear side cowls 166, 166 are positioned outside the rear seat 42 in the sideward direction and below the grips 43, 43, respectively. Left and right side edges 166b, 166b of the rear side cowls 166, 166 extend in the longitudinal direction along the side edges 42b, 42b of the rear seat 42 and the grip bodies 160, 160, respectively.

The rear side cowls 166, 166 include side cowl rear portions 167, 167 extend more rearwardly than the rear edge 42c of the rear seat 42, respectively. The rear center cowl 165 covers the side cowl rear portions 167, 167 and the rear end portions of the seat frames 18, 18 from above.

Figure 4:
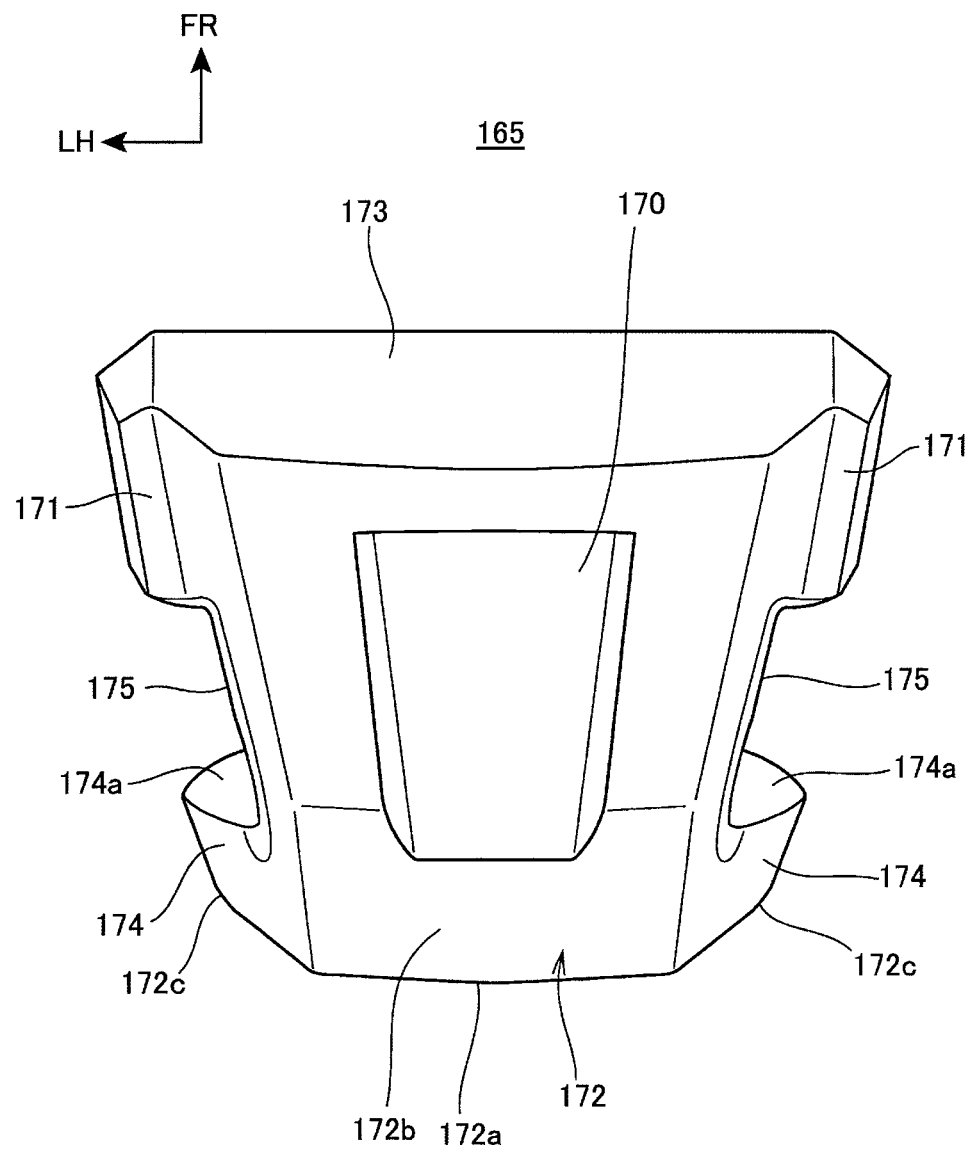
FIG. 4 is a plan view of a rear center cowl.

FIG. 4 is a plan view of the rear center cowl 165.

To describe the rear center cowl 165 with reference to FIG. 2 to FIG. 4, the rear center cowl 165 is formed into a shape tapered toward a rear side thereof as viewed in a plan view, wherein the left and right side edges of the rear center cowl are positioned more inside in the vehicle width direction as the left and right side edges extend rearwardly. A rear edge of the rear center cowl 165 is shorter than a front edge of the rear center cowl 165 in the vehicle width direction. An upper surface of the rear center cowl 165 is contiguously formed with an upper surface of the rear seat 42, and extends rearwardly and upwardly as viewed in a side view.

The rear center cowl 165 includes, as integral portions thereof a plate-like cowl body portion 170 which extends rearwardly contiguously with the rear seat 42 along extensions L, L of the left and right side edges 42b, 42b of the rear seat 42; a pair of left and right front sidewardly projecting portions 171, 171 (closely arranged portions) projecting more outwardly in the vehicle width direction than the extensions L, L (FIG. 2) from a front end portion of the cowl body portion 170; a rear center cowl rear end portion 172 extending more rearwardly from the side cowl rear portions 167, 167; and a front surface portion 173 which faces a rear end surface of the rear seat 42 in an opposed manner and extends to the front and downwardly. The rear center cowl 165 is formed as an integral body by resin molding.

The rear center cowl rear end portion 172 extends downwardly along frontwardly and downwardly extending rear surfaces 167a of the side cowl rear portions 167, 167 (FIG. 3).

The rear center cowl rear end portion 172 includes a pair of left and right rear sidewardly projecting portions 174, 174 which projects more outwardly in the vehicle width direction than the extensions L, L. The rear center cowl rear end portion 172 has a rear surface 172a, an upper surface 172b, and left and right side surfaces 172c, 172c. Front surfaces 174a, 174a of the rear sidewardly projecting portions 174, 174 are brought into contact with and are connected to the rear surfaces 167a, 167a of the side cowl rear portions 167, 167. Further, a rear end 172d of the rear center cowl rear end portion 172 (rear end of the rear center cowl) is positioned behind rear ends 167c of the side cowl rear portions 167, 167 (rear ends of the rear side cowl).

Due to the formation of the front sidewardly projecting portions 171, 171 and the rear sidewardly projecting portions 174, 174, a pair of left and right recessed portions 175, 175, having side portions thereof indented inwardly in the vehicle width direction as viewed in a plan view, is formed on an intermediate portion of the rear center cowl 165 in the longitudinal direction. The recessed portions 175, 175 overlap with the side cowl rear portions 167, 167 from above. Thus, it appears that portions of the side cowl rear portions 167, 167 are positioned in the inside of the recessed portions 175, 175 respectively as viewed in a plan view from above.

A rear cover 176 is mounted on a lower surface of the rear center cowl rear end portion 172. The tail lamp 64 is arranged such that the tail lamp 64 is embedded into a lower portion of the rear surface 172a of the rear center cowl rear end portion 172 and an upper portion of a rear surface of the rear cover 176, and projects more rearwardly than the rear surface 172a.

Figure 5:
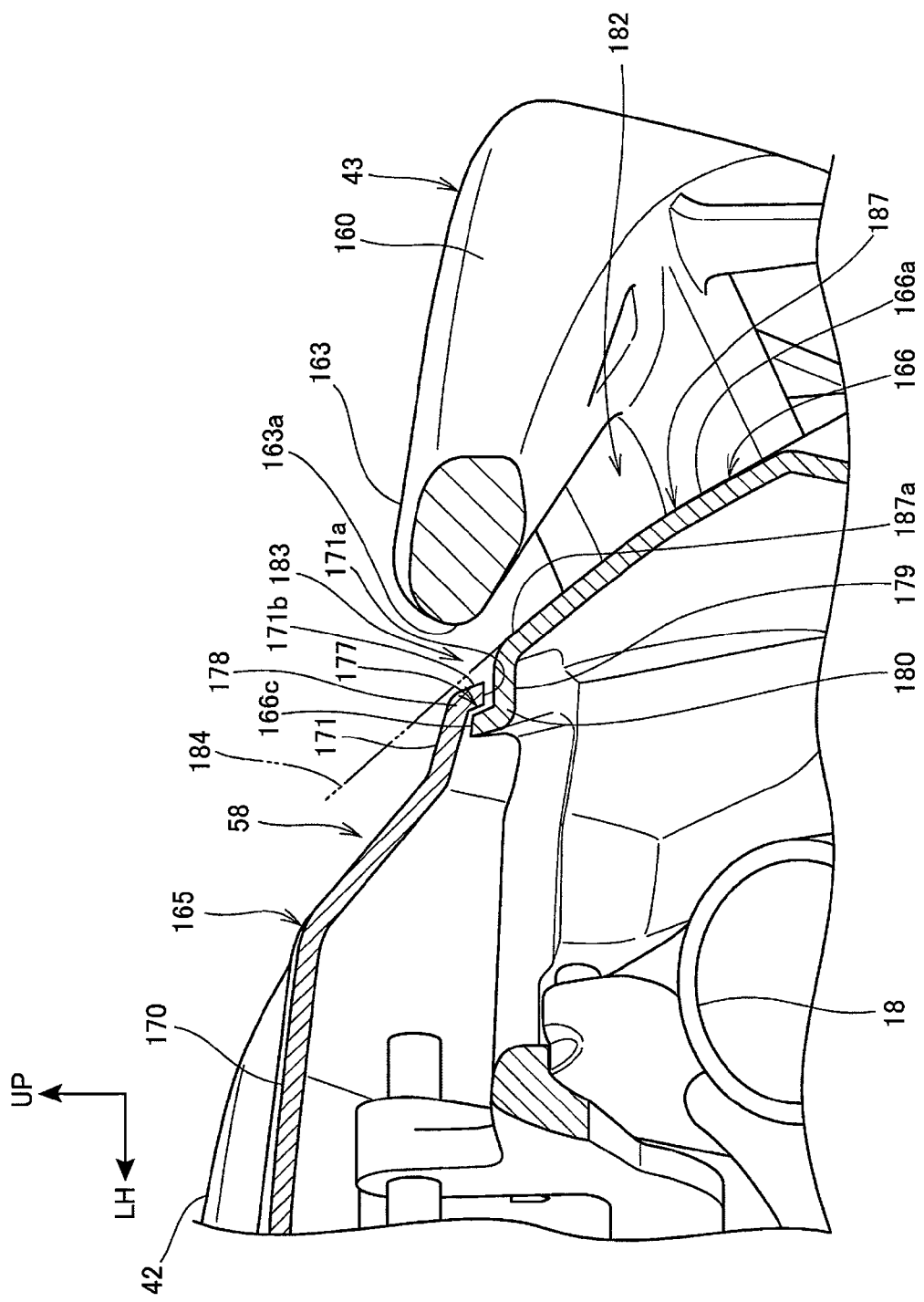
FIG. 5 is a cross-sectional view taken along a line V-V in FIG. 2.

FIG. 5 is a cross-sectional view taken along a line V-V in FIG. 2.

As shown in FIG. 5, the front sidewardly projecting portions 171, 171 and the rear side cowls 166, 166 are joined to each other so as to form a bent surface whose height is lowered toward the outside in the vehicle width direction.

To be more specific, the front sidewardly projecting portions 171, 171 and the rear side cowls 166, 166 are joined to each other at a joint seam portion 177 where lower edges 171a, 171a of the front sidewardly projecting portions 171, 171 (end portions of the rear center cowl) and upper edges 166c, 166c of the rear side cowls 166, 166 (end portions of the rear side cowls) mate with each other.

The lower edges 171a, 171a are lower edges of downwardly bent portions 178 which are bent downwardly in the substantially vertical direction from outer edge portions of the front sidewardly projecting portions 171, 171 in the vehicle width direction.

The upper edges 166c, 166c are upper edges of upwardly bent portions 180 which are bent upwardly in the substantially vertical direction from inner edge portions 179 of the rear side cowls 166, 166 extending inwardly in the vehicle width direction and in the substantially horizontal direction.

The front sidewardly projecting portions 171, 171 are assembled to the rear side cowls 166, 166 such that inner surfaces of the lower edges 171a, 171a are arranged close to or are brought into contact with outer surfaces of the upper edges 166c, 166c, and lower surfaces of the lower edges 171a, 171a are arranged close to or are brought into contact with upper surfaces of the inner edge portions 179. More specifically, the upper edges 166c, 166c of the rear side cowls 166, 166 are covered by upper surface portions of the front sidewardly projecting portions 171, 171 from above, and are covered by the lower edges 171a, 171a from the outside. Thus, rainwater or the like minimally enters an upper edge 166c, 166c side.

To describe this embodiment with reference to FIG. 2 to FIG. 5, the grips 43, 43 are arranged such that, as viewed in a plan view, the grip bodies 160, 160 are inclined along the side edges 42b, 42b of the rear seat 42 and a distance between the grip bodies 160, 160 is gradually decreased toward rear portion sides of the grip bodies 160, 160.

The grips 43, 43 are, as viewed in a side view, arranged such that upper surfaces of the grip bodies 160, 160 extend rearwardly and upwardly along the side edges 42b, 42b of the rear seat 42.

The grips 43, 43 are arranged more outside in the vehicle width direction than the side edges 42b, 42b of the rear seat 42, and front gripping spaces 181, 181 and rear gripping spaces 182, 182 are formed between the grip bodies 160, 160 and the side edges 42b, 42b, respectively.

The front gripping spaces 181, 181 are positioned between the front mounting portions 161, 161 and the rear mounting portions 162, 162 in the longitudinal direction, respectively. The rear gripping spaces 182, 182 are positioned between the rear mounting portions 162, 162 and the rear end inwardly projecting portions 163, 163.

A pillion passenger seated on the rear seat 42 can grip the grip bodies 160, 160 so as to wrap around the substantially whole circumferences of the grip bodies 160, 160 with his hand by passing his fingers through the front mounting portions 161, 161 or the rear mounting portions 162, 162 thus firmly gripping the grips 43, 43.

For example, the pillion passenger grips the grip bodies 160, 160 such that the pillion passenger places his hand on the grip body 160, 160 on a side of the rear gripping space 182, 182 from above, passes his thumb through the rear mounting portion 162, 162 from above and, thereafter the pillion passenger makes his other four fingers wrap around the rear gripping space 182, 182 outwardly in the vehicle width direction and pass through the rear gripping space 182, 182 from below.

The rear end inwardly projecting portions 163, 163 of the grips 43, 43 extend to areas behind the rear gripping spaces 182, 182, respectively, are bent inwardly in the vehicle width direction, and are arranged close to the front sidewardly projecting portions 171, 171 of the rear center cowl 165, respectively. Further, the rear end inwardly projecting portions 163, 163 are formed on rear ends of the grips 43, 43, respectively, and are positioned behind the rear edge 42c of the rear seat 42.

To be more specific, as shown in FIG. 2, the front sidewardly projecting portions 171, 171 are arranged at positions substantially equal to positions of the rear end inwardly projecting portions 163, 163 in the longitudinal direction, and are also arranged at positions substantially equal to positions of the rear end inwardly projecting portions 163, 163 in the height direction. More specifically, the front sidewardly projecting portions 171, 171 of the rear center cowl 165 are arranged at positions where the front sidewardly projecting portions 171, 171 overlap with the rear end inwardly projecting portions 163, 163 of the grips 43, 43 as viewed in a side view.

Figure 6:
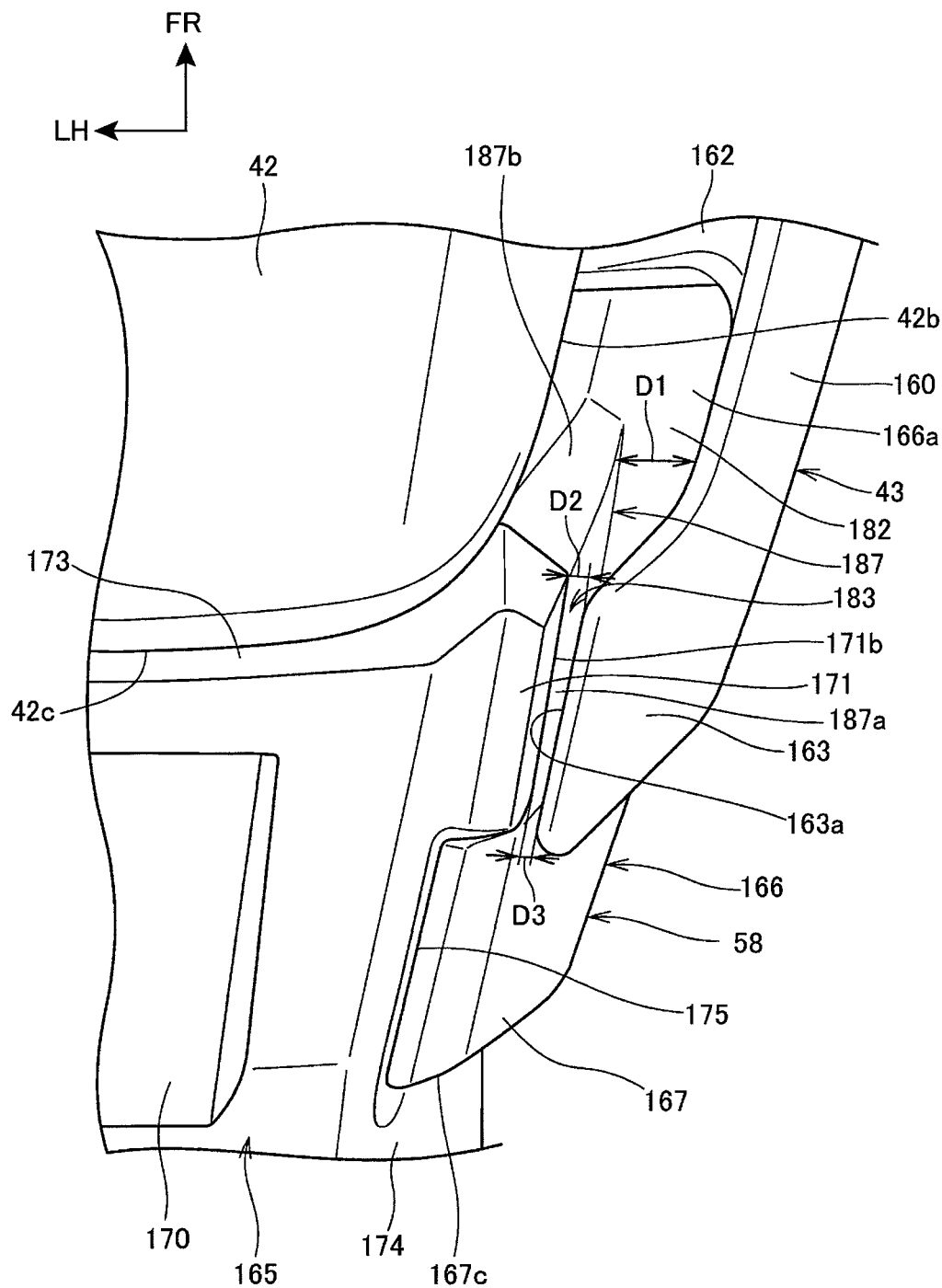
FIG. 6 is a plan view showing, in an enlarged manner, a front sidewardly projecting portion, a rear end inwardly projecting portion, and an area around these projecting portions.

FIG. 6 is a plan view showing the front sidewardly projecting portion 171, the rear end inwardly projecting portion 163 and an area around these projecting portions in an enlarged manner. Since the front sidewardly projecting portion 171 and the rear end inwardly projecting portion 163 are arranged in left-and-right symmetry, the description is made only with respect to parts on a right side in detail.

The outer surface 171b of the front sidewardly projecting portion 171 and the inner surface 163a of the rear end inwardly projecting portion 163 are arranged so as to substantially face each other in an opposed manner and also are arranged in a spaced-apart manner from each other in the vehicle width direction thus defining a space 183 between the outer surface 171b and the inner surface 163a. A lateral width of the space 183 is set to a size where a pillion passenger having a medium build cannot pass his fingers through the space 183 rearwardly. More specifically, the outer surface 171b is arranged close to the inner surface 163a to an extent wherein the pillion passenger cannot pass his fingers through the space 183 rearwardly.

Further, by making an inclination angle of the outer surface 171b and an inclination angle of the inner surface 163a different from each other as viewed in a plan view, a lateral width of the space 183 is gradually narrowed toward a rear side.

As shown in FIG. 5 and FIG. 6, the rear side cowl 166 has a projecting portion 187 for projecting toward an area in the vicinity of a rear end portion of the grip body 160 at a position inside the grip body 160 in the vehicle width direction. The projecting portion 187 includes, as integral parts thereof, a rear projecting portion 187a contiguously formed with a lower edge of the front sidewardly projecting portion 171 with a front projecting portion 187b positioned in the rear gripping space 182 as viewed in a plan view.

An upper portion of the rear projecting portion 187a is arranged at a position where the upper portion overlaps with a lower portion of the rear end inwardly projecting portion 163 as viewed in a side view, and is spaced apart from the inner surface 163a of the rear end inwardly projecting portion 163 by a distance substantially equal to a width of the space 183 in the vehicle width direction.

The front projecting portion 187b is positioned in front of the front sidewardly projecting portion 171 and in the vicinity of an inner surface of the rear end portion of the grip body 160. Although the front projecting portion 187b is positioned below the grip body 160, the front projecting portion 187b is arranged at a position where when a pillion passenger grips the grip body 160 on a rear gripping space 182 side and, thereafter, the pillion passenger slips his fingers rearwardly, the fingers are arranged at a position where the fingers are brought into contact with the front projecting portion 187b. A distance between the front projecting portion 187b and the grip body 160 is gradually decreased toward a rear side.

Assuming a distance between the outer surface of the front projecting portion 187b and the inner surface of the grip body 160 outside the front projecting portion 187b as D1, and a distance between a front end of the outer surface 171b of the front sidewardly projecting portion 171 and the inner surface 163a outside the front end as D2, and a distance between a rear end of the outer surface 171b of the front sidewardly projecting portion 171 and the inner surface 163a outside the rear end as D3, these distances D1 to D3 satisfy the size relationship of distance D1>distance D2>distance D3. Accordingly, when fingers shift rearwardly from the rear gripping space 182, the more rearwardly the fingers slip, the more firmly the fingers are sandwiched.

As described above, by forming the front sidewardly projecting portions 171, 171 on the rear center cowl 165 and by arranging the front sidewardly projecting portions 171, 171 close to the rear end inwardly projecting portions 163 of the grips 43 thus forming the spaces 183 where fingers of a pillion passenger cannot pass therethrough, it is possible to prevent the fingers of the pillion passenger which hold the grip body 160 in the vicinity of the rear gripping space 182 from slipping rearwardly. Further due to the formation of the spaces 183, the spaces 183 can absorb a size error or an assembling error of the grips 43. Thus, it is possible to easily control size accuracy of parts.

A lateral width of the space 183 is gradually narrowed toward a rear side. Thus, when fingers enter the space 183, the more rearwardly the fingers moves, the more firmly the fingers are sandwiched. Accordingly, it is possible to encourage a pillion passenger to properly hold the grip body 160.

This embodiment is described with reference to FIG. 3 and FIG. 5, wherein the rear end inwardly projecting portion 163 overlaps with the joint seam portion 177 from the outside as viewed in a side view, and conceals the joint seam portion 177. Accordingly, it is possible to prevent the joint seam portion 177 from being visually recognized from the side. Thus, the external appearance can be enhanced.

The joint seam portion 177 is arranged more inside in the vehicle width direction than the upward extension 184 (extension) which extends upwardly along a portion of the outer surface 166*a* of the rear side cowl 166, 166 in the vicinity of the joint seam portion 177. Accordingly, it is possible to prevent the fingers of a pillion passenger from coming into contact with the joint seam portion 177.

As has been described heretofore, according to the embodiment to which the invention is applied, the motorcycle 1 includes the grips 43, 43 which are formed for a passenger (pillion passenger) who rides behind an operator and are mounted on the seat frames 18, 18 of the vehicle body frame F. The seat frames 18, 18 are covered by the rear cowl 58. The rear cowl 58 includes the front sidewardly projecting portions 171, 171 which are arranged at positions which overlap with the grips 43, 43 respectively as viewed in a side view of the motorcycle 1 and are arranged close to the grips 43, 43 as viewed in a plan view. With such a configuration, the distances between the grips 43, 43 and the front sidewardly projecting portions 171, 171 of the rear cowl 58 become small. Thus, it is difficult for a passenger's hand to pass through between the grips 43, 43 and the front sidewardly projecting portions 171, 171 whereby it is possible to prevent the passenger's hand holding the grips 43, 43 from slipping from the grips 43, 43.

The rear cowl 58 is disposed behind the rear seat 42 for the passenger, and the front sidewardly projecting portions 171, 171 are arranged outside the rear edge 42*c* of the rear seat 42 in the vehicle width direction. Accordingly, the distances between the grips 43, 43 and the front sidewardly projecting portions 171, 171 can be made small with a simple configuration where the front sidewardly projecting portions 171, 171 of the rear cowl 58 are arranged outside the rear edge 42*c* of the rear seat 42 in the vehicle width direction. Thus, it is possible to prevent a passenger's hand from slipping from the grips 43, 43.

The distances between the grips 43, 43 and the front sidewardly projecting portions 171, 171 are gradually narrowed as the grips 43, 43 extend rearwardly. Accordingly, the more rearwardly side a passenger's hand positioned between the grips 43, 43 and the front sidewardly projecting portions 171, 171 moves, the more strongly the passenger's hand is sandwiched between the grips 43, 43 and the front sidewardly projecting portions 171, 171, respectively. Accordingly, it is possible to encourage a passenger to properly hold the grips 43, 43, and it is possible to prevent the passenger's hand from slipping from the grips 43, 43.

The rear cowl 58 includes the rear center cowl 165 with the pair of left and right rear side cowls 166, 166, lower edges 171*a*, 171*a* of the rear center cowl 165 and the upper edges 166*c*, 166*c* of the rear side cowls 166, 166 form the joint seam portions 177, and the joint seam portions 177 being covered by the grips 43, 43 as viewed in a side view, respectively. Accordingly, the joint seam portions 177 can be concealed by the grips 43, 43. Thus, the external appearance can be enhanced.

In the joint seam portions 177, the upper edges 166*c*, 166*c* of the rear side cowls 166, 166 are arranged at positions inside the lower edges 171*a*, 171*a* of the rear center cowl 165 in the vehicle width direction. Accordingly, it is possible to prevent rainwater or the like from intruding into the joint seam portions 177 from the upper edges 166*c*, 166*c* of the rear side cowls 166, 166.

The joint seam portions 177 are arranged at positions inside the upward extensions 184 extending upwardly along the outer surfaces 166*a*, 166*a* of the rear side cowls 166, 166 in the vehicle width direction. Accordingly, it is possible to prevent a passenger's hand holding the grips 43, 43 from coming into contact with the joint seam portions 177.

The front sidewardly projecting portions 171, 171 are formed on front ends of the rear center cowl 165, and are arranged close to the rear end inwardly projecting portions 163, 163 which constitute the rear ends of the grips 43, 43. Thus, a range within which a passenger can hold the grips 43, 43 can be ensured in a large length and, at the same time, a design having integrity can be acquired where the rear ends of the grips 43, 43 and the front ends of the rear center cowl 165 are contiguously formed. Thus, the external appearance can be improved.

The rear center cowl 165 is formed such that the front end and the rear end of the rear center cowl 165 expand in the vehicle width direction as viewed in a plan view and the longitudinal center portion of the rear center cowl 165 is indented inwardly in the vehicle width direction, and the rear end 172*d* of the rear center cowl 165 is positioned behind the rear ends 167*c* of the rear side cowls 166, 166. Accordingly, the rear center cowl 165 is positioned behind the rear side cowls 166, 166 as viewed in a plan view as well as in a side view. Thus, the external appearance is enhanced.

The above-mentioned embodiment merely shows one mode to which the invention is applied, and the invention is not limited to the above-mentioned embodiment.

In the above-mentioned embodiment, the description is made by taking a motorcycle as an example of a saddle-ride-type vehicle. However, the saddle-ride-type vehicle may be a vehicle having three or more wheels, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle, comprising:
   a grip mounted on a vehicle body frame for a passenger who rides behind an operator; and
   a rear side cowl and a rear center cowl for covering the vehicle body frame, the rear side cowl overlapping the rear center cowl in a length wise direction of the vehicle,
   wherein said rear center cowl includes a first portion overlapping with the grip in the length wise direction of the vehicle.

2. The saddle-ride vehicle according to claim 1, wherein the rear center cowl is disposed behind a seat of the passenger, and the first portion is arranged outside a rear edge of the seat in a vehicle width direction.

3. The saddle-ride vehicle according to claim 1, wherein a distance between the grip and the first portion is gradually narrowed as the grip extends rearwardly.

4. The saddle-ride vehicle according to claim 2, wherein a distance between the grip and the first portion is gradually narrowed as the grip extends rearwardly.

5. The saddle-ride vehicle according to claim 2, wherein an end portion of the rear center cowl and an end portion of the rear side cowl form a joint seam portion, and the joint seam portion is covered by the grip as viewed in a side view.

6. The saddle-ride vehicle according to claim 1, wherein an end portion of the rear center cowl and an end portion of the rear side cowl form a joint seam portion, and the joint seam portion is covered by the grip as viewed in a side view.

7. A saddle-ride vehicle comprising:
a grip mounted on a vehicle body frame for a passenger who rides behind an operator;
a rear cowl for covering the vehicle body frame; and
said rear cowl includes a first portion overlapping with the grip in a length wise direction of the vehicle,
wherein the rear cowl includes a rear center cowl and a rear side cowl and
wherein an end portion of the rear center cowl and end portion of the rear side cowl form a joint seam portion, and the joint seam portion is covered by the grip as viewed in a side view.

8. The saddle-ride vehicle according to claim 7, wherein in the joint seam portion, the end portion of the rear side cowl is arranged at a position inside the end portion of the rear center cowl in a vehicle width direction.

9. The saddle-ride vehicle according to claim 7, wherein the joint seam portion is arranged at a position inside an extension extending upwardly along a side surface of the rear side cowl in a vehicle width direction.

10. The saddle-ride vehicle according to claim 8, wherein the joint seam portion is arranged at a position inside an extension extending upwardly along a side surface of the rear side cowl in a vehicle width direction.

11. The saddle-ride vehicle according to claim 7, wherein the first portion is formed on a front end of the rear center cowl, and is arranged close to a rear end of the grip.

12. The saddle-ride vehicle according to claim 8, wherein the first portion is formed on a front end of the rear center cowl, and is arranged close to a rear end of the grip.

13. The saddle-ride vehicle according to claim 9, wherein the first portion is formed on a front end of the rear center cowl, and is arranged close to a rear end of the grip.

14. The saddle-ride vehicle according to claim 7, wherein the rear center cowl is formed such that a front end and a rear end of the rear center cowl expand in the vehicle width direction as viewed in a plan view and a longitudinal center portion of the rear center cowl is indented inward in the vehicle width direction, and a rear end of the rear center cowl is positioned behind a rear end of the rear side cowl.

15. The saddle-ride vehicle according to claim 8, wherein the rear center cowl is formed such that a front end and a rear end of the rear center cowl expand in the vehicle width direction as viewed in a plan view and a longitudinal center portion of the rear center cowl is indented inward in the vehicle width direction, and a rear end of the rear center cowl is positioned behind a rear end of the rear side cowl.

16. A saddle-ride vehicle comprising:
a vehicle body frame;
a seat mounted on the vehicle frame, the seat having a front edge and a rear edge;
a grip formed for a passenger who rides behind an operator, said grip being mounted on a vehicle body frame;
a rear cowl for covering the vehicle body frame, the rear cowl being behind the vehicle seat and having a front edge; and
said rear cowl including a first portion arranged at a position for overlapping with the grip as viewed in a side view of the vehicle,
wherein a front edge of the grip is in front of the front edge of the rear cowl and a rear edge of the grip is behind the front edge of the rear cowl.

17. The saddle-ride vehicle according to claim 16, wherein the rear cowl is disposed behind a seat of the passenger, and the first portion is arranged outside a rear edge of the seat in a vehicle width direction.

18. The saddle-ride vehicle according to claim 16, wherein the rear cowl includes a rear center cowl having the front edge and further comprises a pair of left and right rear side cowls, end portions of the rear center cowl and end portions of the rear side cowls form joint seam portions, and each joint seam portion is covered by the grip as viewed in a side view.

19. The saddle-ride vehicle according to claim 17, wherein the rear cowl includes a rear center cowl having the front edge and further comprises a pair of left and right rear side cowls, end portions of the rear center cowl and end portions of the rear side cowls form joint seam portions, and each joint seam portion is covered by the grip as viewed in a side view.

20. The saddle-ride vehicle according to claim 18, wherein in the joint seam portion, the end portion of the rear side cowl is arranged at a position inside the end portion of the rear center cowl in a vehicle width direction.

* * * * *